Patented Apr. 25, 1933

1,905,630

UNITED STATES PATENT OFFICE

ORIN R. DOUTHETT, OF PERTH AMBOY, NEW JERSEY, ASSIGNOR TO THE BARBER ASPHALT COMPANY, OF PHILADELPHIA, PENNSYLVANIA, A CORPORATION OF WEST VIRGINIA

BITUMINOUS EMULSION

No Drawing. Application filed August 31, 1928, Serial No. 303,369. Renewed September 7, 1932.

My invention relates to an improvement in bituminous emulsions and method of producing and more particularly relates to bituminous emulsions which are non-creaming and substantially resistant to breaking or separation on freezing and thawing.

Heretofore it has been known to produce bituminous emulsions for use as binders, adhesives, coating compositions, etc., and such emulsions have heretofore included pitches, tars and tar-like substances, resins, natural and artificial asphalts and asphaltic products, and the like, emulsified, for example, by agitation with an aqueous dispersing medium as, for example, an alkali, a soap or saponaceous material, etc.

Emulsions of the character indicated as heretofore produced have proved satisfactory under normal conditions, except for a tendency when in storage to cream, or assume a condition where there is a greater concentration of bitumen at the top or bottom, of a container of the emulsion, than in the remaining portion and which requires the emulsion to be vigorously stirred to restore it to a uniform consistency. Further, such emulsions, irrespective of the particular emulsifying material, or dispersing medium used, have possessed a serious defect in that on freezing and thawing they break or separate and this defect has largely prevented the shipment and use of bituminous emulsions during the winter months.

In accordance with my invention, I have discovered that a dispersing medium may be prepared from sludge sulfonic acids and such may be used for the production of bituminous emulsions which will be non-creaming and which will be stable under conditions of freezing and thawing. I contemplate as within the scope of my invention the method of producing the dispersing medium, the emulsifying agent, or dispersing medium, produced in accordance with my method and the bituminous emulsions producible therewith.

Sludge sulfonic acids are, as is well known, obtained in the refining of hydrocarbon oils, as petroleum distillates, in connection with the manufacture of lubricating oil, medicinal oils, etc. In the refining of, for example, petroleum distillates, it is the practice to treat such distillates by agitating them with sulfuric acid, oleum, or sulfur trioxide. During the treatment certain constituents of the petroleum distillates combine with the sulfuric acid to form a series of highly complex compounds which for convenience are generally referred to as sludge sulfonic acids. In the refining process, after the distillate has been subjected to the action of the sulfonating agent, as sulfuric acid, for a period of time, the mixture is allowed to settle into two layers. The upper layer consists of the refined distillate containing some oil soluble sludge sulfonic acids and the lower layer consists essentially of the excess of the sulfonating agent and the water soluble sludge sulfonic acids. The two layers are separated and, for example, the lower layer containing the water soluble sludge sulfonic acids is diluted with water after which the water soluble sludge sulfonic acids will separate from the dilute sulfuric acid and will rise to the top. The crude water soluble sludge sulfonic acids thus obtained and which contain some sulfuric acid, are then treated with lime, or similar agent, in sufficient quantity to neutralize the free sulfuric acid. The precipitated calcium, or other sulfate, is then separated by filtering, or decanting, and the water soluble sludge sulfonic acids are then neutralized with caustic soda with the production of a product consisting essentially of a sodium sulfonate containing a small amount of alkaline earth sulfonates or sulfates and other salts and which is obtainable commercially. Appropriate methods are utilized for recovery of the oil soluble sulfonic acids from the refined distillate.

It will be appreciated that sludge sulfonic acids may vary considerably in their properties due to their source, as for example, the source of the distillate treated and to the exact procedure followed in treating the distillate and the exact procedure followed in the subsequent refining of the sludge sulfonic acids. It will be appreciated that I may utilize, for example, sludge sulfonic acids, or their sodium salts, as sold commercially.

It will be appreciated that other methods are known for the production of sludge sulfonic acids, the above discussion in connection with the production of sludge sulfonic acids being merely illustrative for the purpose of defining what is intended herein by the term "sludge sulfonic acids".

In order to prepare a dispersing medium from sludge sulfonic acids, I treat sludge sulfonic acids for the complete removal of any alkaline earth salts that may be contained in the sludge sulfonic acids. Further, I adjust the alkalinity of such treated sludge sulfonic acids within comparatively narrow limits as, for example, to an alkalinity within about the range pH 12.0–pH 13.0.

In the treatment of the sludge sulfonic acids in accordance with my invention, I take a suitable quantity of sludge sulfonic acids, either water soluble or oil soluble, or a mixture of both, and dilute them with water until a solution containing say about 10% more or less of dry matter is obtained. To this dilute solution I add the stoichiometric quantity of a water soluble oxalate, as for example, oxalic acid, sodium oxalate, potassium oxalate, or other water soluble oxalate. The water soluble oxalate will combine completely with the alkaline earth metals of the sludge sulfonic acids contained in the solution and alkaline earth oxalates will precipitate and may be removed by filtration or other means, if desired. The removal of the precipitated alkaline earth oxalates is, however, not essential, as such precipitated oxalates do not interfere with the subsequent use of the treated solution of sludge sulfonic acids for the production of emulsions in accordance with my invention.

After treatment of the sludge sulfonic acids in aqueous solution with a water soluble oxalate, I add to the solution an alkali in sufficient quantity to bring the solution to an alkalinity within about the range pH 12.0–pH 13.0. As the alkali I may use, for example, sodium hydroxide, or other alkali, alkaline salt, or mixture of salts, or other substance capable of producing the desired alkalinity.

The aqueous solution of sludge sulfonic acids freed from alkaline earth salts and the alkalinity of which has been brought to within about the range pH 12.0–pH 13.0 will be found to be an excellent emulsifying agent, or dispersing medium, for bitumen, as for example, asphalt, natural or artificial, pitches, tars, resins, etc., and the bituminous emulsions produced therewith will be found to be non-creaming and stable or resistant to breaking under conditions of freezing or thawing.

By way of illustration of the treatment of sludge sulfonic acids, for example, as are commercially obtainable for the production of the emulsifying agent, or dispersing medium, in accordance with my invention, an aqueous solution of water soluble sludge sulfonic acids containing say 2.25% dry sulfonic acids is prepared. Upon analysis of such a solution, it will be found that in order to convert the calcium sulfate, or sulfonate, into the oxalate, it is necessary to add say 2.75% of sodium oxalate on the weight of dry sulfonic acids present, that is .0619% of water soluble oxalate on the weight of the solution. The addition of the requisite amount of water soluble oxalate, say for example, sodium oxalate, will have the effect of causing the calcium of the sulfonate, or sulfate, to be precipitated as calcium oxalate through interaction with the sodium oxalate without filtering the solution, there is then added about 0.2% of an alkali, for example, sodium hydroxide, the addition of which will bring the alkalinity of the solution to about pH 12.25.

By way of illustration of the production of bituminous emulsions with the use of the emulsifying agent, or dispersing medium, in accordance with my invention, for example, say 70 parts, more or less, of molten bitumen, as for example, Mexican oil asphalt having a penetration of 170 according to the A.S.T.M. method, may be emulsified with say 30 parts, more or less, of aqueous sludge sulfonic acid solution prepared in accordance with my invention. The bitumen, or asphalt, will be emulsified at once and the emulsion may be repeatedly frozen and thawed without breaking and may be stored for long periods without creaming.

It will be understood that in the preparation of the dispersing medium, in accordance with my invention, I may use either water soluble or oil soluble sludge sulfonic acids, or mixtures thereof. It will be understood that I do not intend that my invention shall be limited to the use of any particular sludge sulfonic acid, nor to the use of any particular water soluble oxalate, nor to the use of any particular alkali. It will be apparent that no special form of apparatus is required either for the production of the emulsifying agent, or dispersing medium, in accordance with my invention or in the production of bituminous emulsions with use thereof.

Having now fully described my invention, what I claim and desire to protect by Letters Patent is:

1. An emulsion including bitumen dispersed in an aqueous medium containing neutralized sludge sulfonic acid treated to render it substantially free from soluble alkaline earth compounds and characterized by the fact that it is of a substantial alkalinity.

2. An emulsion produced by dispersing bitumen in an aqueous medium having an alkalinity within the range pH 12.0–pH 13.0 and containing neutralized sludge sulfonic acid substantially free from soluble alkaline earth compounds.

3. An emulsion produced by dispersing asphalt in an aqueous medium having an alkalinity within about the range pH 12.0–pH 13.0 and containing neutralized sludge sulfonic acid substantially free from soluble alkaline earth compounds.

4. An emulsion including bitumen dispersed in an aqueous medium containing neutralized sludge sulfonic acid treated to render it substantially free from alkaline earth salts and characterized by the fact that it is of a substantial alkalinity.

5. An emulsion produced by dispersing bitumen in an aqueous medium having an alkalinity within about the range pH 12.0–pH 13.0 and containing neutralized sludge sulfonic acid substantially free from alkaline earth salts.

6. The method of preparing a bituminous emulsion, which includes subjecting an aqueous solution of sludge sulfonic acid to treatment with a water soluble salt of oxalic acid for the removal of soluble alkaline earth compounds and dispersing the bitumen in solution.

7. An emulsion including bitumen dispersed in an aqueous medium containing sludge sulfonic acid and a water soluble salt of oxalic acid.

8. An emulsion including bitumen dispersed in an aqueous medium containing sludge sulfonic acid and sodium oxalate.

9. An emulsion including bitumen dispersed in an aqueous medium containing sludge sulfonic acid and a water soluble oxalate and having an alkalinity within the range about pH 12.0–pH 13.0.

10. The method of preparing a bituminous emulsion, which includes subjecting an aqueous solution of sludge sulfonic acid to treatment with a water soluble oxalate for the removal of soluble alkaline earth compounds, adding sufficient alkali to bring the alkalinity of the solution within about the range pH 12.0–pH 13.0 and dispersing a bitumen in the solution.

11. The method of preparing a bituminous emulsion, which includes subjecting an aqueous solution of sludge sulfonic acid to treatment with a water soluble oxalate for the removal of soluble alkaline earth salts, adding sufficient alkali to bring the alkalinity of the solution within about the range pH 12.0–pH 13.0 and dispersing a bitumen in the solution.

12. The method of preparing a bituminous emulsion, which includes subjecting an aqueous solution of sludge sulfonic acid to treatment with sodium oxalate for the removal of alkaline earth compounds and dispersing a bitumen in the solution.

13. The method of preparing bituminous emulsions, which includes subjecting an aqueous solution of sludge sulfonic acid to treatment with sodium oxalate for the removal of alkaline earth compounds, adding sufficient alkali to bring the alkalinity of the solution within about the range pH 12.0–pH 13.0 and dispersing a bitumen in the solution.

14. The method of preparing bituminous emulsions, which includes diluting sludge sulfonic acid with water, adding a water soluble oxalate, adding sufficient alkali to bring the alkalinity of the solution within about the range pH 12.0–pH 13.0 and dispersing a bitumen in the solution.

15. The method of preparing a bituminous emulsion which includes subjecting an aqueous solution of neutralized sludge sulfonic acid to treatment to render it free from soluble alkaline earth compounds and dispersing the bitumen in the solution.

16. The method of preparing a bituminous emulsion which includes subjecting an aqueous solution of neutralized sludge sulfonic acid to treatment to render it free from soluble alkaline earth compounds, adding sufficient alkali to bring the alkalinity of the solution within the range pH 12.0–pH 13.0 and dispersing a bitumen in the solution.

In testimony of which invention, I have hereunto set my hand, at Maurer, N. J., on this 24th day of August, 1928.

ORIN R. DOUTHETT.